US008019779B2

(12) United States Patent
Teng et al.

(10) Patent No.: US 8,019,779 B2
(45) Date of Patent: Sep. 13, 2011

(54) EFFICIENT LOCKING PROTOCOL FOR SUB-DOCUMENT CONCURRENCY CONTROL USING PREFIX ENCODED NODE IDENTIFIERS IN XML DATABASES

(75) Inventors: James Zu-Chia Teng, San Jose, CA (US); Brian Shaun Vickery, Los Gatos, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2134 days.

(21) Appl. No.: 10/709,416

(22) Filed: May 4, 2004

(65) Prior Publication Data

US 2006/0004758 A1 Jan. 5, 2006

(51) Int. Cl.
*G06F 17/30* (2006.01)
(52) U.S. Cl. ......... 707/783; 707/705; 707/786; 707/802
(58) Field of Classification Search .................. 707/1, 8, 707/9, 100, 200, 705, 783, 786, 802
See application file for complete search history.

(56) References Cited

U.S. PATENT DOCUMENTS

| | | | | |
|---|---|---|---|---|
| 5,485,607 | A | | 1/1996 | Lomet et al. .................. 395/600 |
| 5,983,225 | A | | 11/1999 | Anfindsen .......................... 707/8 |
| 6,411,964 | B1 | | 6/2002 | Iyer et al. ...................... 707/200 |
| 6,529,905 | B1 | * | 3/2003 | Bray et al. ......................... 707/8 |
| 6,606,626 | B1 | | 8/2003 | Ponnekanti ....................... 707/8 |
| 6,748,470 | B2 | * | 6/2004 | Goldick ........................ 710/200 |
| 6,772,155 | B1 | * | 8/2004 | Stegelmann ...................... 707/8 |
| 6,850,938 | B1 | * | 2/2005 | Sadjadi ............................. 707/8 |
| 6,910,039 | B2 | * | 6/2005 | Daynes .............................. 707/8 |
| 2001/0032281 | A1 | | 10/2001 | Daynes .......................... 710/200 |
| 2002/0165870 | A1 | | 11/2002 | Chakraborty et al. ......... 707/206 |
| 2003/0105756 | A1 | | 6/2003 | Daynes .............................. 707/8 |
| 2003/0131167 | A1 | | 7/2003 | Rankin et al. ................. 710/104 |
| 2003/0177443 | A1 | | 9/2003 | Schnelle et al. ............... 715/513 |
| 2003/0210709 | A1 | | 11/2003 | Inoue ............................. 370/469 |
| 2005/0234989 | A1 | * | 10/2005 | Bailey et al. ................ 707/104.1 |

OTHER PUBLICATIONS

Garcia-Molina et al., "Database System Implementation," Chapter 9, Prentice Hall, 2000, Upper Saddle River, New Jersey, USA.
Barghouti et al., "Concurrency Control in Advanced Database Applications," ACM Computing Surveys, V23, N3, Sep. 1991, pp. 269-317.

* cited by examiner

*Primary Examiner* — Tim T. Vo
*Assistant Examiner* — Dangelino N Gortayo
(74) *Attorney, Agent, or Firm* — IP Authority, LLC; Ramraj Soundararajan (57) ABSTRACT

A system and method for concurrency control of hierarchically structured data is provided. Lock requests on a target node are processed by exploiting ancestor-descendant information encoded into prefix encoded node identifiers (IDs). A set of implicit locks on ancestor nodes along a path from an immediate parent of a target node to a root node is derived from an explicit lock request on a target node. A logical lock tree describing existing lock modes for ancestor nodes is consulted to determine compatibility with the derived set of implicit locks. If existing lock modes for ancestor nodes are compatible with the derived set of implicit locks, a lock request on a target node is granted. Otherwise, the lock request is denied. A lock release request follows the reverse process; a target node in a particular transaction is released, as are subsequent locks on its ancestors made by the same transaction.

21 Claims, 11 Drawing Sheets

EFFICIENT LOCKING PROTOCOL FOR SUB-DOCUMENT CONCURRENCY CONTROL USING PREFIX ENCODED NODE IDENTIFIERS IN XML DATABASES

RELATED APPLICATIONS

This application is related to co-pending application entitled "Self-Adaptive Prefix Encoding for Stable Node Identifiers", which is hereby incorporated by reference in its entirety, including any appendices and references thereto.

BACKGROUND OF INVENTION

1. Field of the Invention

The present invention relates generally to the field of concurrency control. More specifically, the present invention is related to a locking protocol for hierarchical data.

2. Discussion of Prior Art

As XML is increasingly used for data exchange over distributed systems, interest in its use as a database data model capable of handling flexibly structured hierarchical data is correspondingly heightened. Currently, a single XML document is used to represent data equivalent to multiply joined relational tables, or even an entire relational database containing interconnected data. Using XML enables databases to obviate the need for normalization and de-normalization; decomposing relational data into multiple tables and re-assembling data using join queries.

In certain cases, XML databases support sub-document concurrency control, allowing users simultaneous access to XML data. Existing techniques of locking individual data records representing nodes in use, which are identified by record identifiers (RIDs), are limited in their provision of data consistency due to the hierarchical nature of XML data. Straightforward extensions of existing locking protocols to XML trees; for example, locking data records corresponding to nodes in the path from a root node to a node currently in use via RID are inefficient.

Typically, a single lock manager handles lock and release requests for an entire database system. Lock and release requests are sent to a lock manager, which is additionally provided as input, a resource ID, node ID, lock mode, and other relevant information. Often implemented in tandem, is a thin layer that performs conversion from one, explicit lock or release request, to an equivalent set of requests for a lock manager. Although such an approach reduces interaction between entities requesting a lock or a release and a lock manager, it is limited in its provision of lock request processing cost reduction.

Thus, there is a need in the art for a locking protocol that supports sub-document concurrency control of hierarchical node data, as well lock manager logic reducing lock-processing cost. A protocol utilizing prefix encoded node identifiers (IDs) exploits a property in which a current node ID is comprised of node IDs of ancestor nodes along the path from the root to a current node. An explicit lock request on a node having a particular node ID derives an implicit lock request the prefix of the particular node ID. An implicitly locked node ID prefix represents intention locks on ancestor nodes assigned node IDs contained within the prefix, from its immediate parent node to a root node ID.

Whatever the precise merits, features, and advantages of the above cited references, none of them achieves or fulfills the purposes of the present invention.

SUMMARY OF THE INVENTION

The system and method of the present invention provides for a locking protocol exploiting prefix encoded node IDs. A prefix encoded node ID value is determined from a concatenation of local node IDs for each node at each level along a path from a root to a target node. An ancestor-descendant relationship is derived from a node ID by stripping one or more concatenated local node IDs at a particular level in a logical node tree. For example, a parent node ID is determined from a child node ID by removing a current local node ID from the rightmost end of a child node ID.

Ancestor-descendant relationships encoded into node IDs are exploited in a multiple granularity locking protocol when applied to logical tree representations of hierarchical data identified by prefix encoded node IDs. An explicit lock request on a target node necessitates intention locks on ancestor nodes along a path from a root node to an immediate parent node. Thus, a set of equivalent intention locks is implicitly derived in response to an explicit lock request on a target node.

Subsequently, a lock request on a target node is granted if ancestor nodes of a target node along a path from a root node to a target node are not currently locked, or are locked in compatible modes. Compatibility is determined by a consultation of a lock mode compatibility matrix. If ancestor nodes are locked in existing lock modes that are not compatible with an implicitly derived set of equivalent intention locks, an explicit lock request on a target node is denied. Additionally, if compatibility is determined, intention lock modes from an implicitly derived equivalent set are implicitly applied to ancestor nodes of a target node, in varying granularities.

A lock on a node is released by releasing locks in sequence along a path starting at a leaf node ending at a root node. Alternately, locks in a path from a target node to a root node are released simultaneously.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

A transaction on a database containing hierarchically structured data is abstracted by read and write operations on data represented by nodes in a logical tree. An exclusive (X) lock excludes all but a single transaction from accessing (reading or writing) a target node whereas a shared (S) lock permits a plurality of transactions to read a target node concurrently, but prevents transactions from updating a target node. Ancestors of a target node are locked in intention (I) mode as an explicit lock is placed on a target node. In particular, nodes are locked in five different modes. A non-leaf node is locked in intention-shared (IS) mode to specify that a descendant node is explicitly locked in S mode. Similarly, an intention-exclusive (IX) lock implies that explicit locking in X mode occurs at a descendant node. A shared, intention-exclusive (SIX) lock on a non-leaf ancestor node indicates that nodes in a sub-tree rooted at a SIX-locked node are locked in S mode, and a lower-level node of an S-locked sub-tree is locked in X lock mode.

To achieve data consistency, a transaction performing read operations on a target node necessitates IS locks on ancestors from an immediate parent node to a root node, and an S lock on a target node itself. An update (U) lock is used in place of an S lock if a transaction is performing a read operation on a node to obtain updated information, which is subsequently upgraded to an X lock before write operations on a node are enabled. For simplicity, S and X locks are considered in the following description.

Similarly, a transaction performing write operations on a target node necessitates IX locks on ancestors from a root node to an immediate parent node, and an X lock placed on a target node itself. Otherwise implemented, a transaction performing write operations on a target node necessitates SIX locks on ancestors from a root node to an immediate parent node, and an X lock placed on a target node itself.

A write operation causing modification to a sibling or parent of a target node requires an X lock to be placed on an immediate parent node, as opposed to an IX lock.

TABLE 1

Compatibility Matrix for Lock Modes

| Lock Request Mode | Current Lock Mode IS | IX | S | SIX | X |
|---|---|---|---|---|---|
| IS | YES | YES | YES | YES | NO |
| IX | YES | YES | NO | NO | NO |
| S | YES | NO | YES | NO | NO |
| SIX | YES | NO | NO | NO | NO |
| X | NO | NO | NO | NO | NO |

The locking protocol of the present invention is based on a compatibility matrix shown in table 1. A lock request on a current node locked in S or IS mode by a transaction, is granted if ancestors of a current node are locked in either IX or IS mode by a transaction. A lock request on a current node locked in X, SIX, or IX mode from a transaction is granted if ancestors of a current node are locked in either SIX or IX mode by said transaction. If ancestor nodes are locked in a mode incompatible with a current node lock request, a lock request is denied.

Figure 1:
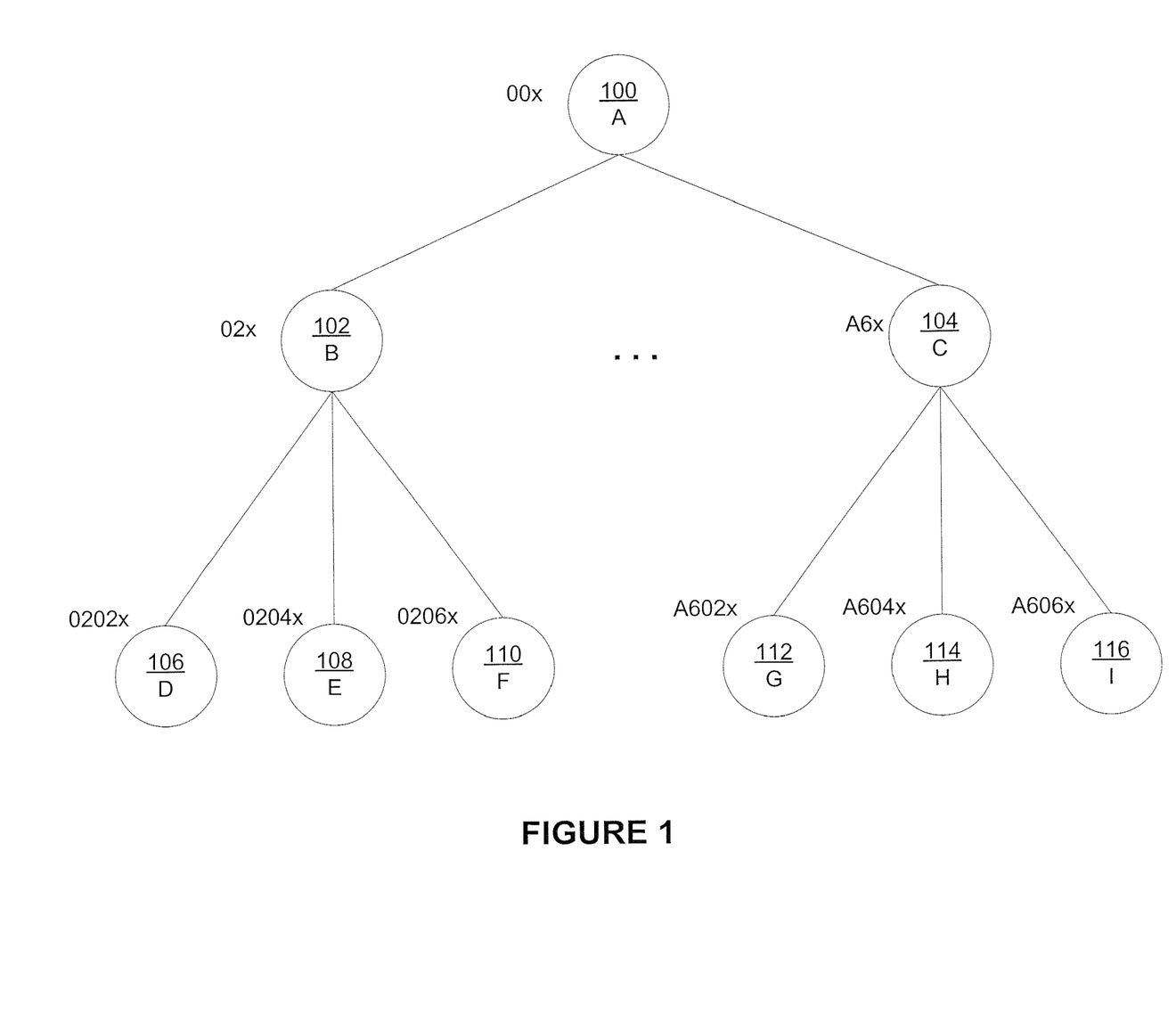
FIG. 1 illustrates a single-rooted logical tree representation of an XML document.
Figure 2:
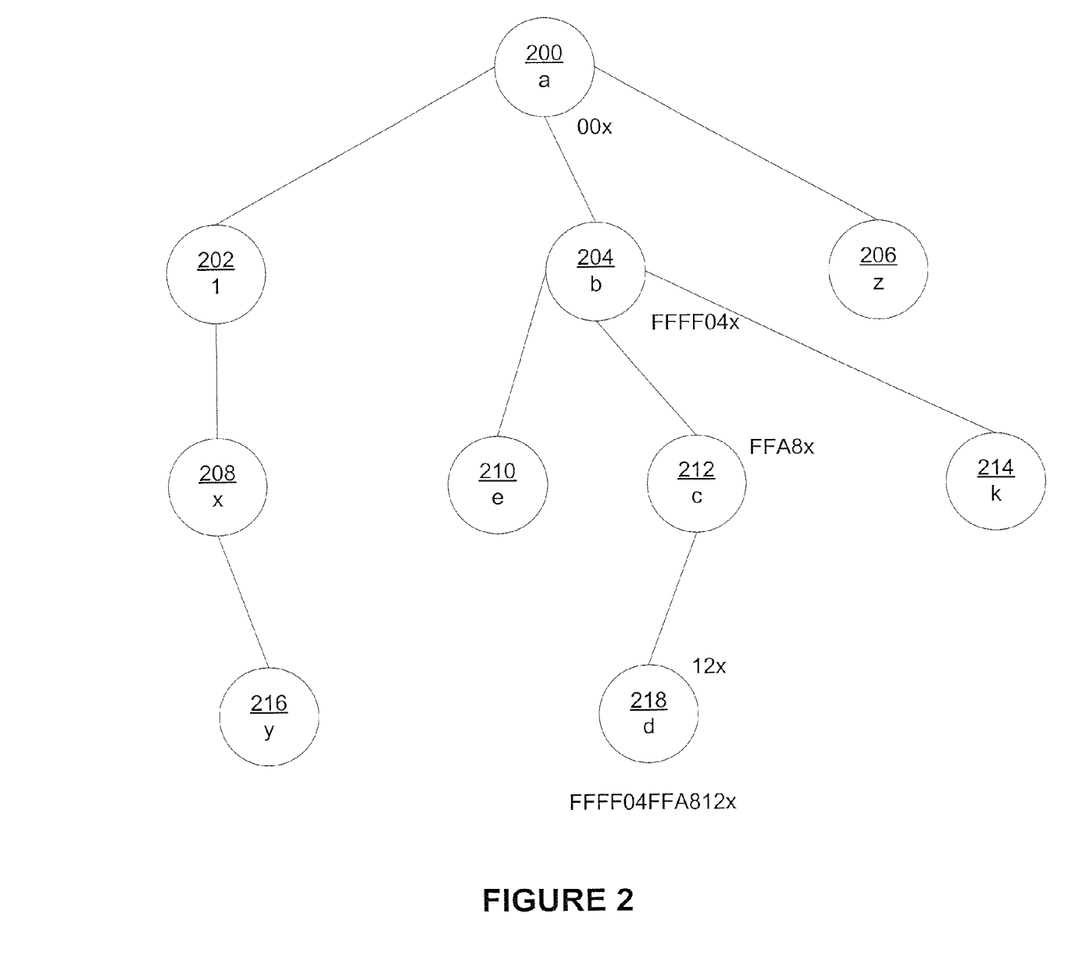
FIG. 2 illustrates local IDs concatenated to form a prefix encoded node ID.

Shown in FIG. 1 is hierarchically structured node data logically represented in a single-rooted tree. A single-rooted logical XML tree is shown as an exemplar, however, the locking protocol is applied to multiply-rooted XML fragments or collection of XML documents in other embodiments. A prefix encoding mechanism of assigning node IDs to nodes logically represented in a hierarchical tree structure is shown as a concatenation of local IDs. Each node is assigned a local ID that is concatenated with local IDs for ancestor nodes along a path from root node to current node to encode a node ID. Prefix encodings shown aside leaf nodes 106, 108, 110, 112, 114, 116 are node IDs resulting from a concatenation of local IDs of a first level, second level, and a third level along a path from a root node to a current node. Node E 108 has a node ID value of 0204x, which is a result of a concatenation of root node A 100 ID 00x with parent node B 102 ID 02x, with leaf node E 108 local ID, 04x. Root node ID 00x is implied in descendant node ID values.

A transaction directly requests a lock on a node in a given lock mode by specifying a node ID of a target node. To improve lock manager performance, a single explicit lock request on a target node is treated as logically equivalent to a set of lock requests on ancestor nodes, as shown in table 2.

TABLE 2

Lock Mode Request Equivalence Relations

| LOCK MODE REQUEST | ANCESTOR NODES LOCK MODE | CURRENT NODE LOCK MODE |
|---|---|---|
| IS | IS | IS |
| IX | IX | IX |
| S | IS | S |
| SIX | SIX | SIX |
| X | IX | X |

In a preferred embodiment, upon receiving a lock request, a lock manager implicitly derives an equivalent set of intention locks based on a prefix encoded node ID for a target node. A compatibility matrix is consulted to determine whether an equivalent, derived set of intention locks is compatible with existing lock modes for each ancestor node. If such a consultation determines compatibility, a target node is locked in a requested mode and ancestor nodes are implicitly locked in a mode as determined by an equivalent, derived set of intention locks. In another embodiment, a lock request on a single target node is converted into a set of explicit lock requests for ancestors of a target node based on a target node ID. Subsequently, explicitly locks are requested one at a time from a lock manger for nodes in a path from a root node to a target node in a top-down sequence. To respond to a release request made by a given transaction, intention locks on ancestor nodes made by the same transaction are released simultaneously, or in sequence from an immediate parent node to a root node, subsequent to the release of a locked target node.

For example, an S lock on a node with node ID 08341A40x obtained by transaction T1 is equivalent to IS locks on its ancestors; root node 00x and the rest of ancestors 08x, 0834x, and 08341Ax, and an S lock on target node assigned node ID 08341A40x. An IS lock on node ID segment 08341Ax implicitly represents a set of IS locks. In one embodiment, such a lock is implemented over top of an existing lock manager with a thin layer.

If a logical lock tree structure is maintained by a lock manager in a manner similar to a node tree hierarchy based on node IDs; in a lock request-processing phase, a lock manager processes lock requests efficiently by consulting a compatibility matrix. In one embodiment, locks on ancestor nodes are represented implicitly, and segments of prefix encoded node IDs are implicitly locked in a given intention mode. An implicit intention lock on a node ID segment is explicitly expanded on demand, thus an intention lock would be explicitly applied to each node in an XML tree. However, in a preferred embodiment, implicit locking decreases the number of explicit locks to be maintained and matching efficiency during lock request processing is increased. Shown in FIGS. 3a-h are operations in an approach to a preferred embodiment of the present invention, a logical tree structure composed of implicit locks on ancestor node ID segments. Variable granularity specifies how many ancestor nodes are grouped, implicitly locked, and represented together. In a compressed embodiment, granularity is specified in terms of an entire single-rooted node tree; there is only one node in a logical lock tree. In an expanded embodiment, exemplified in FIG. 4, granularity is in terms of singular hierarchical data nodes; there is a one-to-one correspondence between nodes in a single-rooted logical tree representation of an XML document and nodes in a logical lock tree. FIGS. 3b, 3d, 3f, and 3h illustrate a preferred embodiment, in which nodes in a logical lock tree indicate a node ID segment, corresponding to one or more nodes in a single-rooted logical tree representation of an XML document.

Figure 3A:
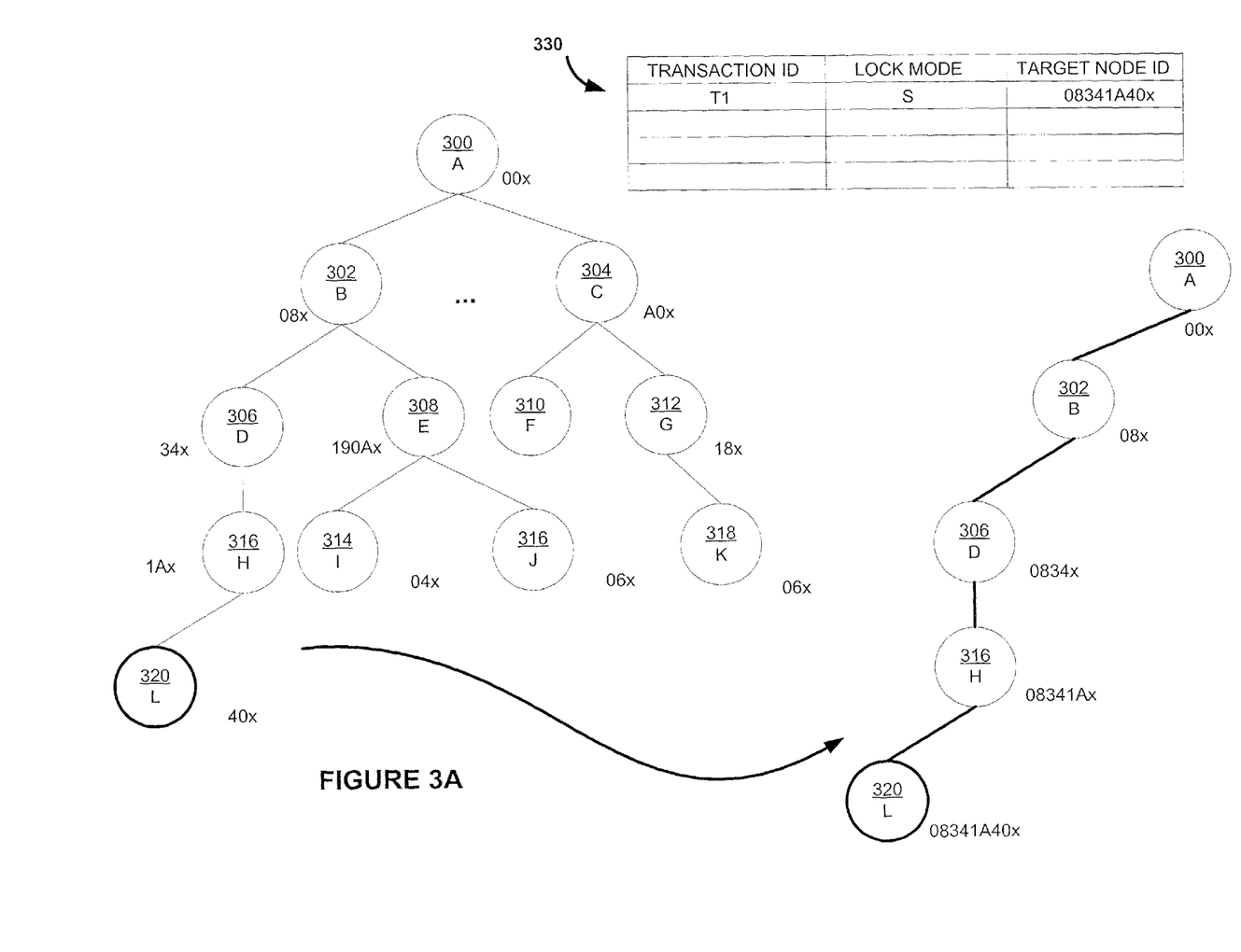
FIG. 3a-3h, collectively, illustrate lock request processing and corresponding operations on a logical lock tree.

Shown in FIG. 3a is an incoming lock request for node L 320. A lock request is shown in table 330 as being constituted of a transaction with transaction ID T1. Additionally, lock request for node L 320 is shown as being requested in S lock mode. Lastly, shown in table 330, is a node ID for a target node on which a lock is requested. In the exemplary figure, a lock is requested on node L 320 having a node ID of 08341A40x. A lock request in S lock mode on a node L 320 with node ID 08341A40x made by transaction T1, is equivalent to an explicit S lock on node L 320 and IS locks on ancestors of node L 320; root node A 300, node B 302, node D 306, and node H 316. Because an ancestor-descendant relationship is encoded in the prefix of a given target node ID, an IS lock implicitly applied to a prefix encoded segment 08341Ax of node ID 08341A40x assigned to node L 320 is used to represent a set of IS locks on nodes corresponding to segment 08341Ax. An advantage of the method of the present invention lies in the fact that a lock manager is provided with logic necessary to derive a corresponding implicit intention lock request or set of requests for a group of ancestor nodes, given only an explicit lock request on a node. In another embodiment, an implicit IS lock on prefix encoded segment 08341Ax is expanded to individual, explicit IS locks on node A 300, node B 302, and node D 306, and node H 316.

Figure 3B:
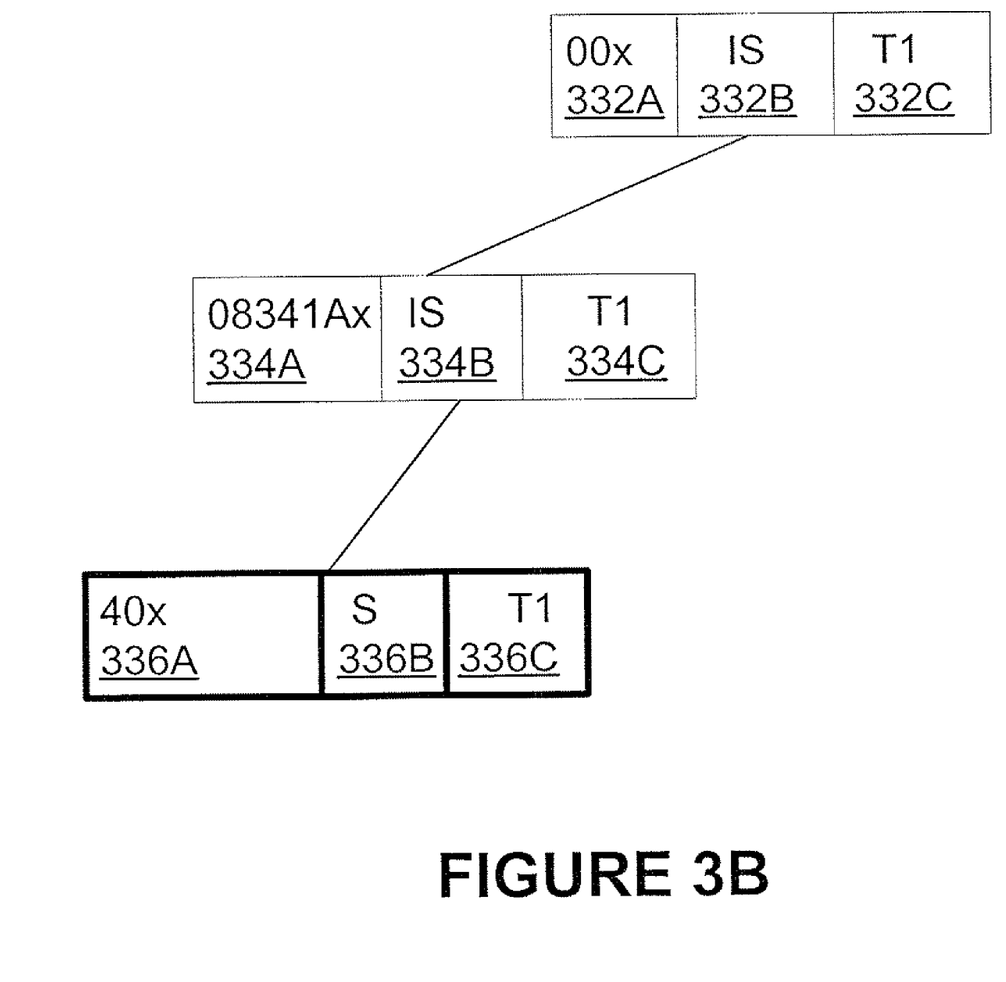

Shown in FIG. 3b is a logical lock tree structure representing an initial lock request on node L 320. Once a lock request is granted, logical lock tree nodes representing a target node comprised of: a node ID segment, explicit or implicit lock mode, and corresponding transaction ID are created and linked in a logical lock tree structure. In FIG. 3b, node A 300 is represented as logical lock tree node 332 comprising node ID segment field 332a, lock mode field 332b, and transaction ID field 332c. Descendent node B 302, node D 306, and node H 326 of root node A 300 are represented as logical lock tree node 334 comprising node ID segment field 334a, lock mode field 334b, and transaction ID field 334c. Logical lock tree node 334 represents an implicit IS lock on node ID segment field 08341Ax; when expanded, it corresponds to explicit IS locks on node B 302, node D 306, and node H 316. Logical lock tree node 336 represents an explicit S lock on target node L 320.

Figure 3C:
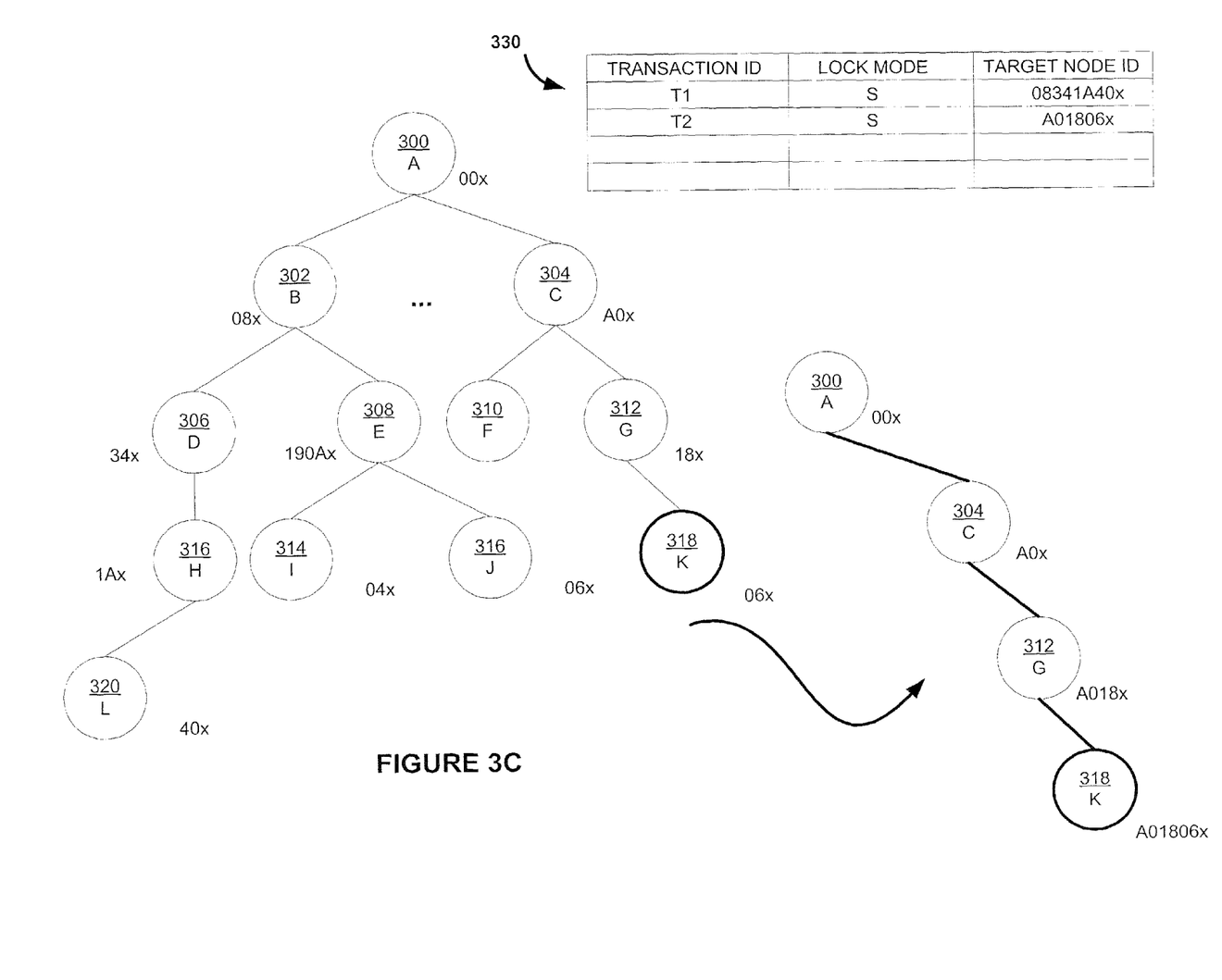
Figure 3D:
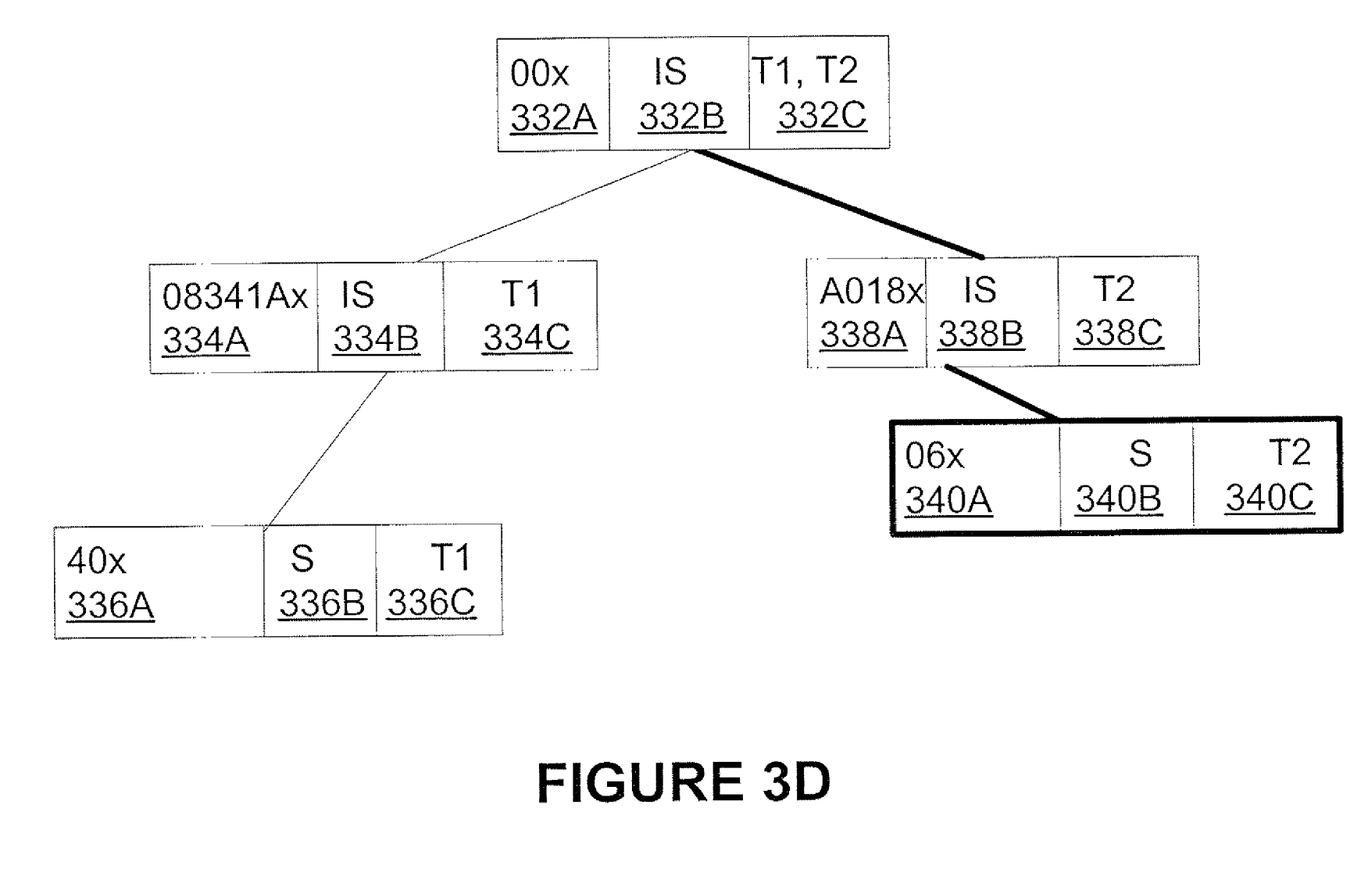

Referring now to FIG. 3c, an S lock request is received for node K 318 in a transaction having an ID of T2. Table 330 shows a target node ID A01806x for node K 318 on which a lock is requested, a lock mode of S for a lock request, and a transaction ID T2 indicating the transaction requesting a lock on target node K 318. Subsequently, a lock manager constructs logical lock tree shown in FIG. 3d to determine whether a requested lock is to be granted. A consultation to a compatibility matrix determines that ancestor nodes are currently locked in a mode that is compatible with an implicitly derived set of equivalent locks. Logical lock tree node 338 representing node ID segment A018x corresponding to implicitly locked node C 304 and node G 312, and logical lock tree node 340 corresponding to explicitly locked node K 318 are created and inserted into a logical lock tree. Because an IS lock is placed on node A 300 by both transactions T1 and T2, logical lock tree node transaction ID field 332c is modified to indicate both transactions T1 and T2.

Figure 3E:
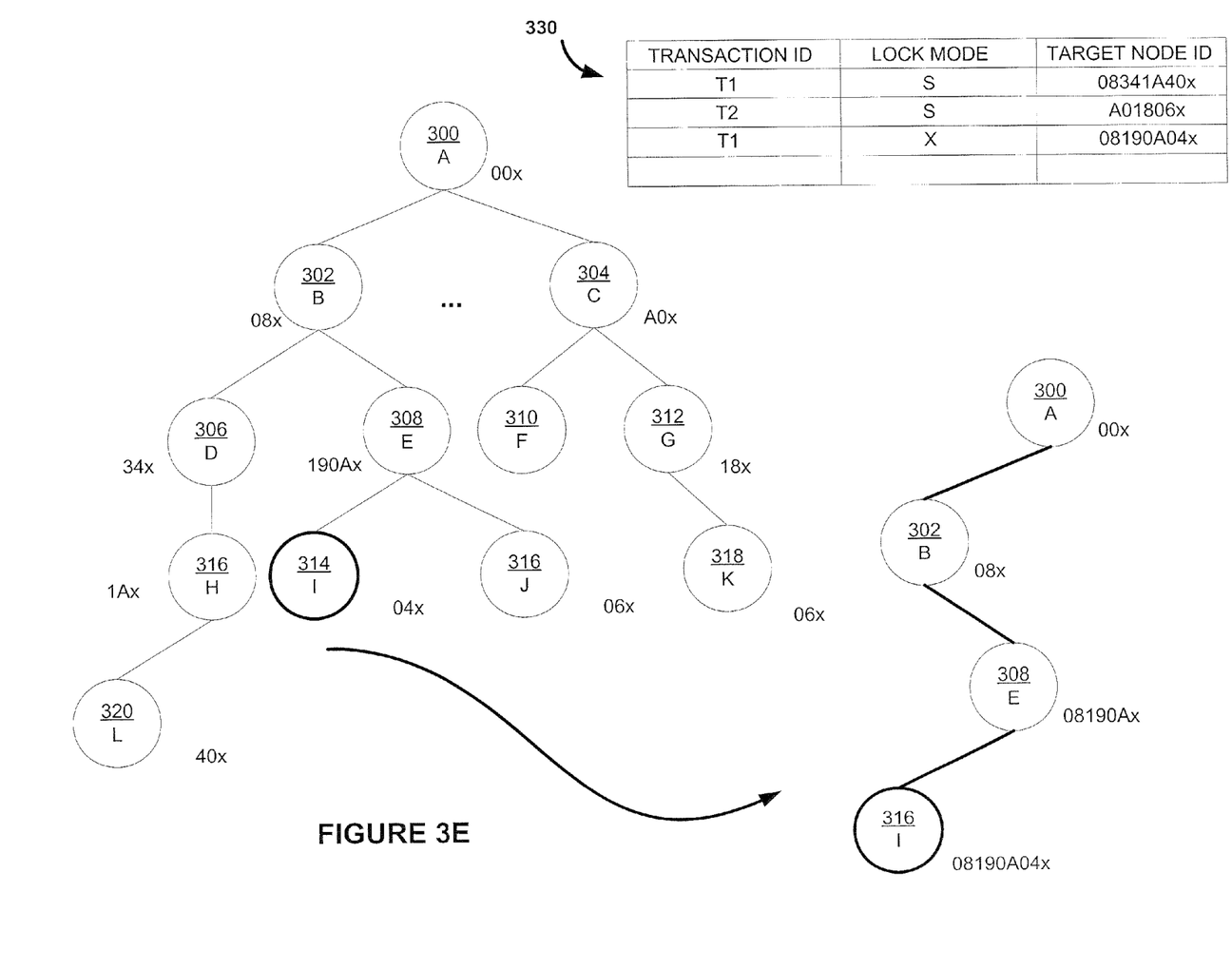

Referring now to FIG. 3e, a lock request on node I 314 is made by transaction T1. Shown in table 330 alongside a second entry for transaction T1, is a target node ID for node I 314, 08190A04x, and a requested lock mode, X. As with previously granted lock requests, a compatible, implicitly derived set of equivalent locks is applied to a node ID segment corresponding to ancestors of node I 316. In order to determine locks to be placed on ancestor node A 300, node B 302, and node E 308, table 2 is consulted. From a consultation of table 2, it is determined that IX locks are to be placed on ancestor nodes of node I 316. Because node I 316 shares ancestors with locked node L 320 and locked node K 318, it is necessary to consult table 1 to determine whether existing lock modes are compatible with an IX lock mode. Since existing logical lock tree nodes 332 and 334 are locked in IS mode, it is determined IX lock mode is compatible.

In a traditional lock protocol, intentional lock requests are explicitly issued for ancestors of a locked target node. Such a protocol is unable to implicitly derive intentional lock requests if ancestor relationship information is not encoded in node IDs. Thus, in a traditional lock protocol, it becomes the job of a transaction to issue intentional lock requests on ancestor nodes, explicitly. Within the lock protocol of the present invention, relationship information encoded into a node ID allows a lock manager to derive a set of intentional locks represented by a single implicit lock on a node ID segment, which corresponds to ancestors of a target node.

Figure 3F:
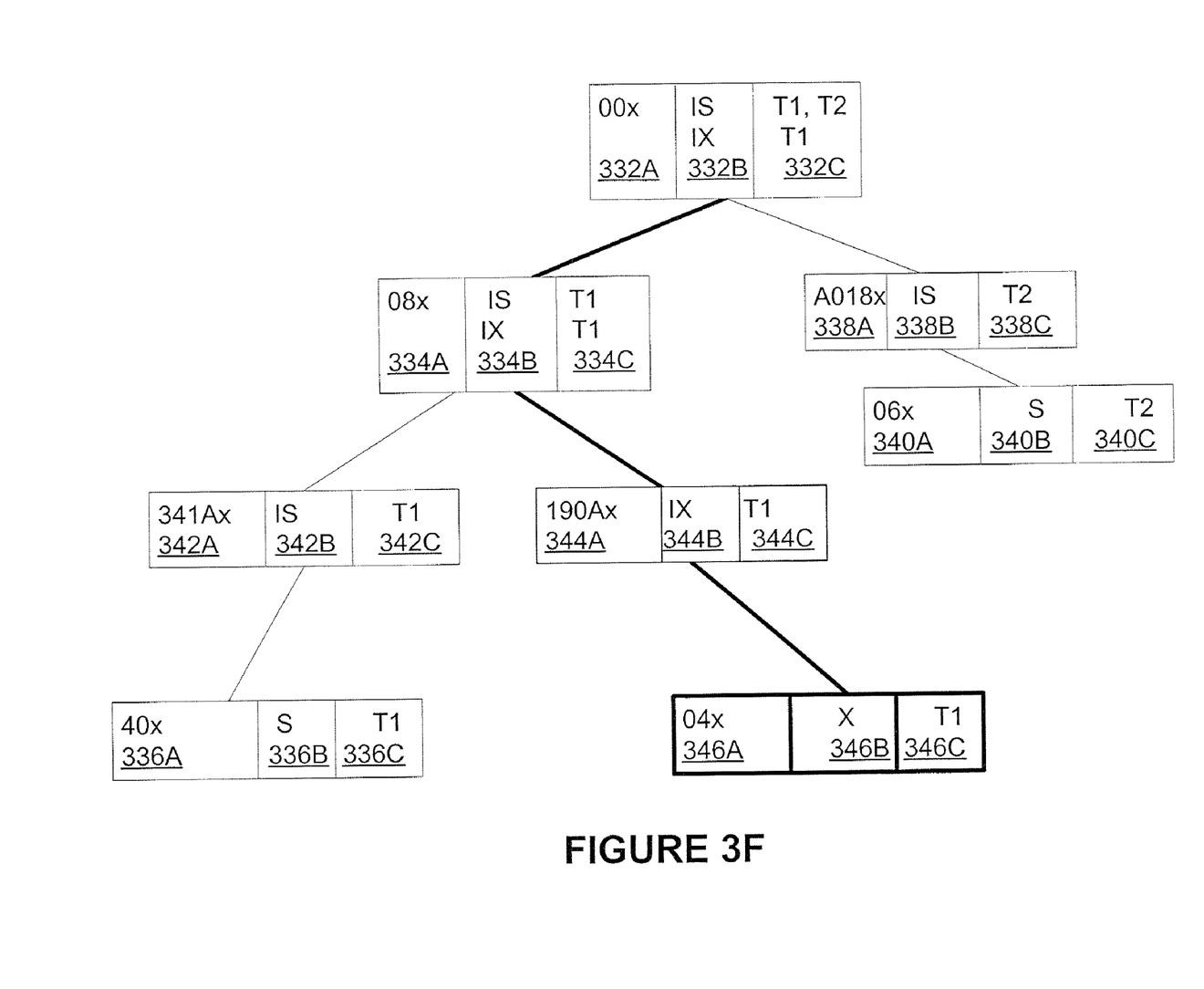

Shown in FIG. 3f is a logical lock tree after a lock request on node I 316 has been granted. Note that logical lock tree node 334 is split in a node ID split process. Logical lock tree node 334 now contains as its node ID segment field, 08x and a new logical lock tree node 342 is created for node ID segment 341Ax. Logical lock tree node 334 is now locked in IX mode 334b by transaction T1 334c, as well. Logical lock tree node 334 having node ID segment field 334a 08x is expanded such that it corresponds to node B 302, and logical lock tree node 342 is created such that node ID segment 341Ax remains locked in IS mode, corresponding now to node D 306 and node H 316. A node ID split process occurs when different portions of a node ID segment are locked in differing modes and by differing transactions. This is due to the fact that, in some embodiments, a node ID segment, and hence a logical lock tree node, corresponds to more than one XML node.

Existing logical lock tree nodes 332 and 334 are modified to indicate implicit IX locks resulting from transaction T1 locked node I 316. Additionally, logical lock tree nodes 344 and 346 are created and inserted into logical lock tree to represent IX and X locks, respectively, requested by transaction T1. Logical lock tree node 344 corresponds to node E 308 and logical lock tree node 346 corresponds to target node I 314.

Figure 3G:
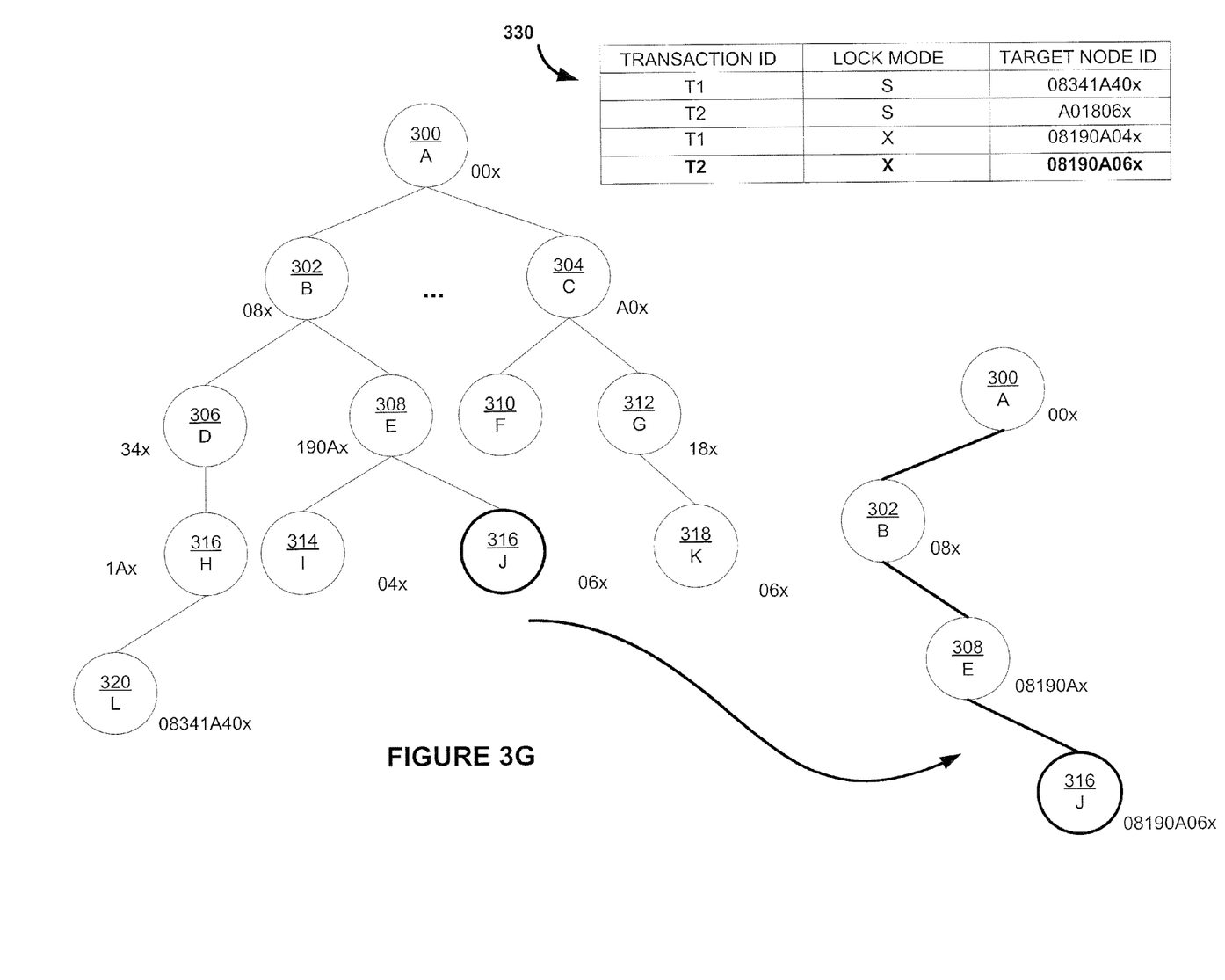
Figure 3H:
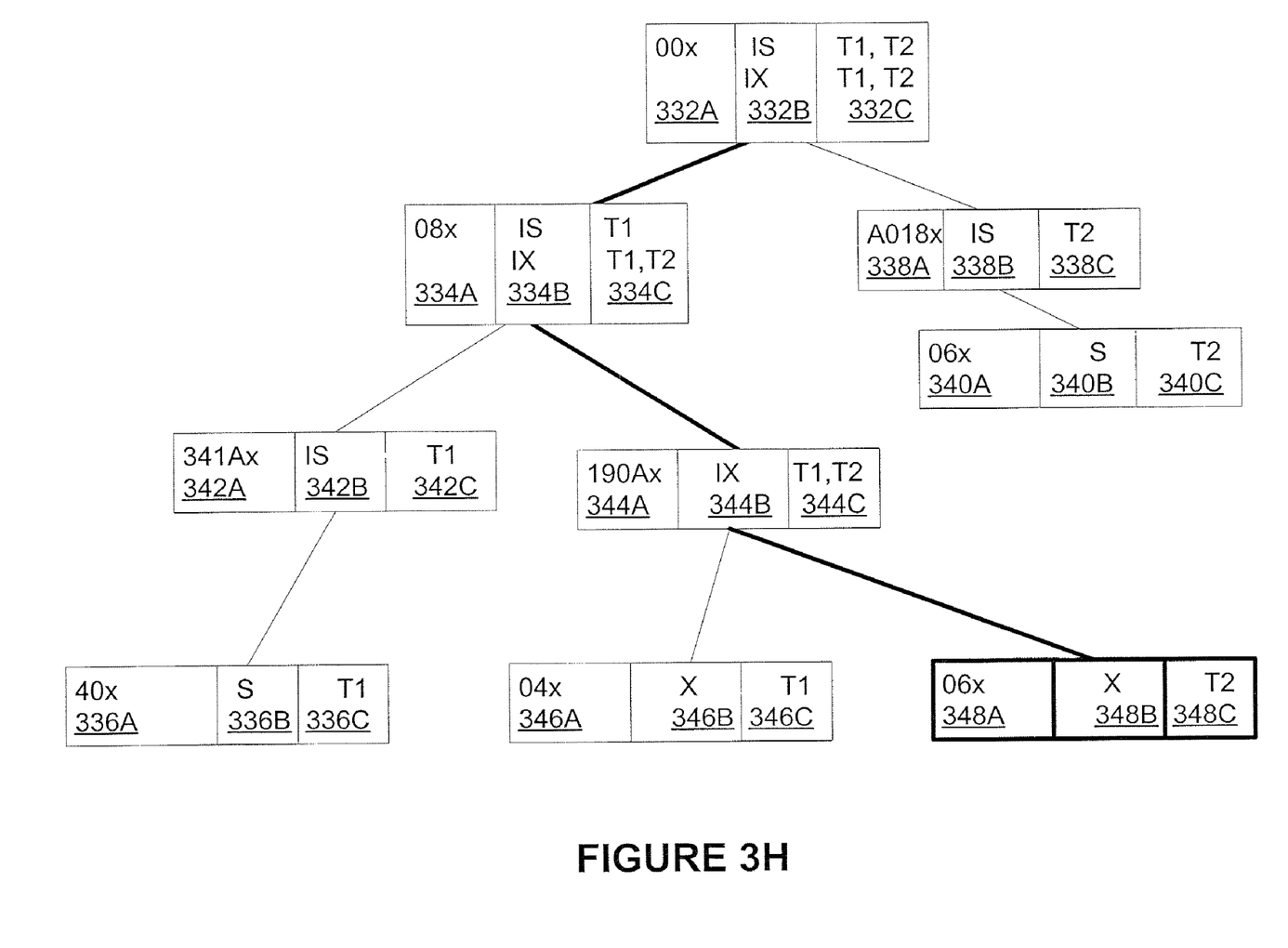

In FIG. 3g, a lock request on node J 316 is made by transaction T2. Upon consultation of table 2, it is determined that ancestor node A 300, node B 302, and node E 308 are to be implicitly locked in IX mode by transaction T2. Because node J 316 shares ancestor nodes with node I 314, table 1 is consulted to determine compatibility of derived set of lock modes for ancestor nodes with existing lock modes of shared ancestor nodes in logical lock tree. Upon a determination of compatibility, logical lock tree nodes 332, 334, and 344 are modified to indicate an IX lock made by transaction T2 in addition to an existing IX lock made by transaction T1. FIG. 3h illustrates a resultant logical lock tree as X lock request on node J 316 is granted. A new logical lock tree node 348 is created and inserted into a logical lock tree to show that node J 316 is locked by transaction T2 in X lock mode.

Figure 4:
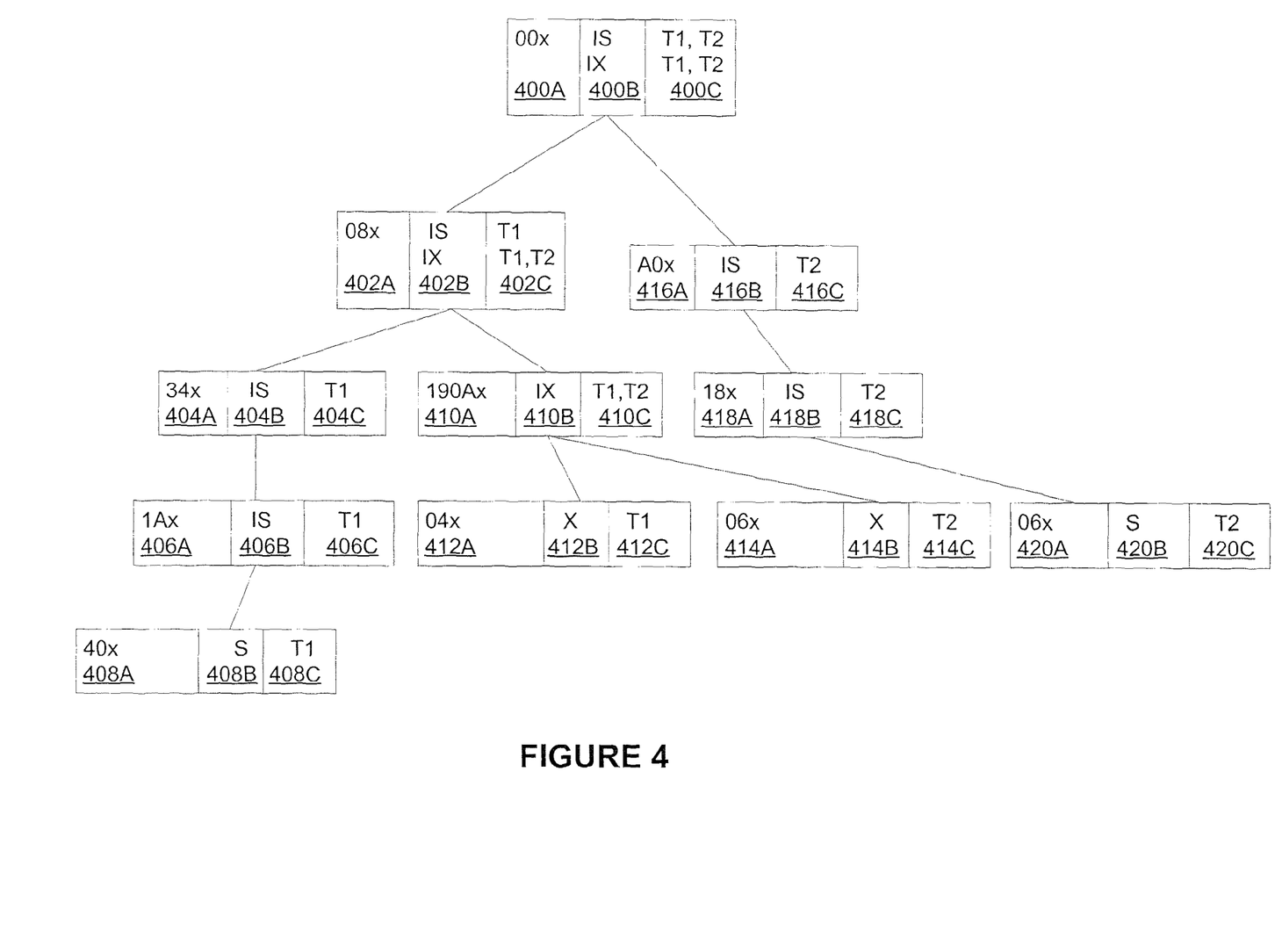
FIG. 4 illustrates an expanded set of locks in a logical lock tree.

Shown in FIG. 4 is a logical lock tree in an expanded embodiment, an implicit lock on a node ID segment corresponding to more than one node is expanded such that explicit logical lock tree nodes are shown for each node represented by a single node ID segment. For example, in FIG. 3*b*, logical lock tree node 334 containing node ID segment 08341Ax locked in IS mode, corresponds implicitly to node B 302, node D 306, and node H 316 locked in IS mode. In FIG. 4, logical lock tree node 402, 404, and 406 represent node B 302, node D 306, and node H 316, respectively.

Locks are released either simultaneously at the end of a transaction, or in leaf-to-root order using a two-phase locking protocol. If locks are released one at a time, a transaction is specified to indicate a lock release on a single node, or a lock release on a node and its ancestors. In a two-phase locking protocol, consistency and serializability are guaranteed by allowing a transaction lock phase, followed by transaction lock release phase. In the method of the present invention, explicit release requests for a node derive implicit releases on node ID segments representing ancestor nodes.

In a preferred embodiment, when locks are released, logical lock tree nodes are modified or deleted. If a logical lock tree node corresponding to a node or nodes still locked by another transaction, or if a corresponding node or nodes is still locked by the same transaction in a lock mode not contained in a derived, equivalent set, a logical lock tree node corresponding to a released node or nodes is modified. Otherwise, if upon release of a lock on a node, there exist no locks held by any transaction upon said node, a corresponding logical lock tree node is deleted from a logical lock tree.

For example, releasing a lock on node J 316 results in the deletion of logical lock tree node 348 and the modification of logical lock tree nodes 344, 334, and 332. Logical lock tree nodes 344, 334, and 332 have transaction ID fields modified such that transaction T2 locking a node in corresponding IX mode, is deleted. In a preferred embodiment, a node ID segment merge process occurs when locks are released. A node ID segment merge process is the reverse process of a node ID segment split; a merge process allows a reduction in number of explicitly locked node ID segments and improves lock request processing performance. In other embodiments, a logical lock tree remains unchanged. In one embodiment, a lock release process is facilitated by a linked list of nodes locked by a common transaction to speed up the lock release processing. In a second embodiment, if locks are not released simultaneously at the end of a transaction, a count is used to represent the number of lock requests on a given node by a single transaction. A lock request increments such a count, while a release request decrements it. When the count reaches zero, its corresponding transaction is removed from a logical lock tree.

The locking protocol of the present invention is based on hierarchical, logical node IDs. Depending on a physical storage layout, logical node ID representations may or may not correspond to records identified by a record ID (RID) in physical storage where node data is actually stored. The following embodiments illustrate approaches to a locking protocol based on different types of mappings between physical and logical data representations.

In a first embodiment, each logical node is stored as a physical record, thus there exists a one-to-one mapping between a logical node ID and a physical RID. In this embodiment, prefix encoding for node IDs is stable and does not necessitate an extra storage layout requirement. Logical node IDs are used in a locking protocol of the present invention without mapping or converting to RIDs.

In a second embodiment, a plurality of logical node representations are grouped within a single physical record. To avoid concurrency issues, a lock request on a target node ID is converted into a lock request on an entire physical record to which a target node belongs. Specifically, a lock request on a target node is converted into a set of lock requests on a set of records that contain ancestor nodes of a target node, along a path from a root node to a target node. Facilitated by a mapping mechanism between node IDs and RIDs as necessarily described for node access; RIDs for records containing nodes along a path from a root node to a target node are obtained. An equivalent set of locks determined from an explicit lock request on a node ID via a consultation of table 2, is applied to entire physical records obtained in a prior step. Given a target node ID, records containing nodes along a path from a root node to a target node, are locked using their RIDs, in a lock mode corresponding to implicit ancestor lock modes shown in table 2.

The lack of hierarchical information available in an RID admits the consultation of a table deriving a set of equivalent locks from an explicit lock. However, the consultation of a compatibility matrix is not admitted because a plurality of ancestor nodes for different locked nodes may be contained in a single record. Additionally, this embodiment applies to an approach wherein a single record contains a plurality of sub-trees.

In a third embodiment, an entire document is stored in a contiguous physical storage unit, such as a single record. To provide for concurrency control, sub-trees stored in contiguous physical storage are mapped to a range of storage identifiers, RIDs, in support of sub-document concurrency.

Additionally, the present invention provides for an article of manufacture comprising computer readable program code contained within implementing one or more modules to provide concurrency control for hierarchically structured data. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) processing a lock request on a target node; (b) deriving from an explicit lock request on a target node, a set of implicit locks on ancestor nodes; and (c) maintaining a logical data structure indicating lock information for each node.

CONCLUSION

A system and method has been shown in the above embodiments for the effective implementation of an efficient locking protocol for sub-document concurrency control using prefix encoded node identifiers in XML databases. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage or display (i.e., CRT) formats. The programming of the present invention may be implemented by one of skill in the art of database or object-oriented programming.

The invention claimed is:

1. A method for controlling concurrent access of prefix encoded nodes in a hierarchically structured document comprising steps of:
   a. processing an explicit lock request on a node by determining ancestor nodes from said node,
   b. deriving implicitly from said explicit lock request, a set of locks for said determined ancestor nodes,
   c. comparing said derived set of implicit locks with existing lock modes for said determined ancestor nodes, and
   d. granting or denying said explicit lock request on said node based on results of said comparing step.

2. The method of claim 1, wherein said hierarchically structured document is an XML document.

3. The method of claim 1, wherein said node is comprised of data and a node identifier (ID).

4. The method of claim 3, wherein said explicit lock mode is any of: a shared (S), update (U), or exclusive (X) lock mode.

5. The method of claim 1, whereupon granting said explicit lock request, one or more of said implicitly derived locks are implicitly applied to said ancestor nodes.

6. The method of claim 4, wherein said implicitly derived lock mode is any of: an intention-shared (IS), intention-exclusive (IX), or a shared, intention-exclusive lock (SIX) mode.

7. The method of claim 6, wherein
   a. an explicit lock request on said node in lock mode S implicitly derives a set of locks in IS mode,
   b. an explicit lock request on said node in lock mode X implicitly derives a set of locks in IX mode,
   c. an explicit lock request on said node in lock mode IS implicitly derives a set of locks in IS mode,
   d. an explicit lock request on said node in lock mode IX implicitly derives a set of locks in IX mode, and
   e. an explicit lock request on said node in lock mode SIX implicitly derives a set of locks in SIX mode.

8. The method of claim 7, wherein said lock request is denied if said comparison step results in incompatibility and granted otherwise; said comparison step results in compatibility between said existing and derived lock modes if lock request mode for said node is:
   a. IS and said ancestor nodes are locked in any existing mode of: IS, IX, S, or SIX,
   b. IX and said ancestor nodes are locked in either existing mode of: IS or IX,
   c. S and said ancestor nodes are locked in either existing mode of: IS or S,
   d. SIX and said ancestor nodes are locked in existing mode of IS, and
   e. X and said ancestor nodes are not currently locked; and said comparison step results in incompatibility between said existing and derived locked modes, otherwise.

9. The method of claim 8, wherein said comparing step is facilitated by a logical data structure indicating existing lock information for each node; said logical data structure comprising logical lock tree nodes.

10. The method of claim 9, wherein said logical lock tree nodes are comprised of at least: a node ID field, a transaction ID field, and a lock mode field.

11. The method of claim 10, whereupon granting a lock request, a logical lock tree node for said node is created and ID of said node is inserted into said logical lock tree node ID field, a transaction ID is inserted into said logical lock tree node transaction ID field, a lock mode is inserted into said logical lock tree node lock mode field; and if logical lock tree nodes exist for said ancestor nodes, adding either one or both of: a transaction ID to said logical lock tree transaction ID fields and adding said lock mode to said logical lock tree node lock mode fields;
else
creating logical lock tree nodes for said ancestor nodes, inserting IDs of said ancestor nodes into said logical lock tree node ID fields, inserting a transaction ID into said logical lock tree node ID fields, inserting a transaction ID into said logical lock tree node transaction ID fields, and inserting a lock mode into said logical lock tree node lock mode fields.

12. An article of manufacture comprising a computer usable medium having computer readable program code embodied therein which implements concurrent access control of prefix encoded nodes in a hierarchically structured document comprising modules implementing code for:
   a. processing an explicit lock request on a node by determining ancestor nodes from said node,
   b. deriving implicitly from said explicit lock request, a set of locks for said determined ancestor nodes,
   c. comparing said derived set of implicit locks with existing lock modes for said determined ancestor nodes, and
   d. granting or denying said explicit lock request on said node based on results of said comparing step.

13. The article of manufacture of claim 12, wherein said hierarchically structured document is an XML document.

14. The article of manufacture of claim 12, wherein said node is comprised of data and a node identifier (ID).

15. The article of manufacture of claim 12, wherein said explicit lock mode is any of: a shared (S), update (U), or exclusive (X) lock mode.

16. The article of manufacture of claim 15, wherein said implicit lock mode is any of: an intention-shared (IS), intention-exclusive (IX), or a shared, intention-exclusive lock (SIX) mode.

17. The article of manufacture of claim 16, wherein
   a. an explicit lock request on said node in lock mode S derives a set of implicit locks in IS mode,
   b. an explicit lock request on said node in lock mode X derives a set of implicit locks in IX mode,
   c. an explicit lock request on said node in lock mode IS derives a set of implicit locks in IS mode,
   d. an explicit lock request on said node in lock mode IX derives a set of implicit locks in IX mode, and
   e. an explicit lock request on said node in lock mode SIX derives a set of implicit locks in SIX mode to be applied to said determined ancestor nodes.

18. The article of manufacture of claim 17, wherein said comparison step results in compatibility between said existing and derived lock modes if lock request mode for said node is:
   a. IS and said ancestor nodes are locked in any existing mode of: IS, IX, S, or SIX,
   b. IX and said ancestor nodes are locked in either existing mode of: IS or IX,
   c. S and said ancestor nodes are locked in either existing mode of: IS or S, d. SIX and said ancestor nodes are locked in existing mode of IS, and
e. X and said ancestor nodes are not currently locked;
otherwise
said comparison step results in incompatibility between said existing and derived lock modes.

19. A system for controlling concurrent access of prefix encoded nodes in a hierarchically structured document comprising:
  a. a processor receiving as input, an explicit lock request on a node and providing as output ancestor nodes determined from said node,
  b. a converter receiving as input said explicit lock request and deriving as output a set of implicit locks for said output ancestor nodes,
  c. a comparator comparing said derived set of implicit locks with existing lock modes for said output ancestor nodes, and
a lock request grantor, granting or denying said explicit lock request on said node based on output of said comparator.

20. A method for controlling concurrent access of prefix encoded nodes in a hierarchically structured document comprising steps of:
  a. processing an explicit lock release on a node by determining ancestors nodes from said node; said explicit lock release requested by a transaction;
  b. deriving from said explicit lock release, a set of implicit lock modes for said determined ancestor nodes, and
  c. releasing locks on determined ancestor nodes corresponding to said derived implicit lock mode; said locks on determined ancestor nodes originally requested by said transaction.

21. An article of manufacture comprising a computer usable medium having computer readable program code embodied therein which implements concurrent access control of prefix encoded nodes in a hierarchically structured document comprising modules executing:
  a. explicit lock request processing on a node by determining ancestor nodes from said node,
  b. implicit derivation of a set of locks for said determined ancestor nodes from said explicit lock request,
  c. a comparison of said derived set of implicit locks with existing lock modes for said determined ancestor nodes, and
  d. granting or denying said explicit lock request on said node based on results of said comparing step.

* * * * *